US008942396B2

(12) United States Patent
Popovski et al.

(10) Patent No.: US 8,942,396 B2
(45) Date of Patent: Jan. 27, 2015

(54) WIRELESS BINAURAL HEARING SYSTEM

(75) Inventors: Petar Popovski, Aalborg (DK); Peter S. K. Hansen, Smørum (DK); Jacob Midtgaard, Fredensborg (DK)

(73) Assignee: Oticon A/S, Smorum (DK)

( * ) Notice: Subject to any disclaimer, the term of this patent is extended or adjusted under 35 U.S.C. 154(b) by 472 days.

(21) Appl. No.: 13/267,567

(22) Filed: Oct. 6, 2011

(65) Prior Publication Data
US 2012/0087505 A1 Apr. 12, 2012

Related U.S. Application Data

(60) Provisional application No. 61/391,084, filed on Oct. 8, 2010.

(30) Foreign Application Priority Data

Oct. 8, 2010 (EP) .................................... 10186937

(51) Int. Cl.
*H04R 25/00* (2006.01)
*H04L 1/18* (2006.01)
(Continued)

(52) U.S. Cl.
CPC ................. *H04L 1/18* (2013.01); *H04L 12/28* (2013.01); *H04R 25/305* (2013.01); *H04R 25/552* (2013.01); *H04L 2001/0097* (2013.01); *H04R 25/554* (2013.01); *H04R 2225/55* (2013.01)
USPC ............................ 381/315; 381/312; 381/23.1

(58) Field of Classification Search
USPC .................. 381/23.1, 74, 77–82, 312, 315
See application file for complete search history.

(56) References Cited

U.S. PATENT DOCUMENTS 7,529,565 B2 5/2009 Hilpisch et al.
8,041,051 B2 * 10/2011 Pilati et al. ...................... 381/79
(Continued)

FOREIGN PATENT DOCUMENTS

EP 1445982 A1 8/2004
EP 1879426 A2 1/2008
WO WO 2008/151623 A1 12/2008

OTHER PUBLICATIONS

Asaduzzaman et al., "Automatic Request for Cooperation (ARC) and Relay Selection for Wireless Networks", IEICE Trans. Commun., vol. E92-B, No. 3, Mar. 2009, pp. 964-972.
(Continued)

*Primary Examiner* — Disler Paul
(74) *Attorney, Agent, or Firm* — Birch, Stewart, Kolasch & Birch, LLP

(57) ABSTRACT

A wireless binaural hearing system comprises a left-ear hearing device, a right-ear hearing device and auxiliary devices. The devices communicate via radio signals. Each device comprises a radio transmitter transmitting messages, each hearing device comprises a radio receiver receiving messages, the auxiliary device is adapted to transmit application messages, and the hearing devices are adapted to receive application messages. The quality of wireless communication varies when the user moves his head, which may lead to temporal gaps in communication. Such gaps may cause annoying pauses and/or delays in audio signals presented to the user, and the hearing devices may become temporarily unsynchronised. To avoid such gaps and improve reliability of the communication, without increasing the radio signal power, a first hearing device relays received application messages to a second hearing device in dependence on network messages received from the second hearing device indicating whether application messages were correctly received.

12 Claims, 3 Drawing Sheets

(51) Int. Cl.
  *H04L 12/28* (2006.01)
  *H04L 1/00* (2006.01)

(56) References Cited

U.S. PATENT DOCUMENTS

| | | | |
|---|---|---|---|
| 8,145,246 B2 * | 3/2012 | Rasmussen | 455/502 |
| 8,155,047 B2 * | 4/2012 | Eguchi | 370/315 |
| 8,194,902 B2 * | 6/2012 | Pedersen | 381/315 |
| 8,571,241 B2 * | 10/2013 | Larsen | 381/315 |
| 8,588,443 B2 * | 11/2013 | Glatt et al. | 381/315 |
| 2006/0067550 A1 | 3/2006 | Puder et al. | |
| 2006/0291680 A1 | 12/2006 | Roeck | |
| 2007/0269049 A1 | 11/2007 | Glatt et al. | |
| 2009/0238375 A1 * | 9/2009 | Pilati et al. | 381/79 |

OTHER PUBLICATIONS

Haartsen et al., "Bluetooth: Vision, Goals, and Architecture", Mobile Computing and Communications Review, vol. 2, No. 4, Oct. 1, 1998, pp. 38-45.

Nosratinia et al., "Cooperative Communication in Wireless Networks", IEEE Communications Magazine, vol. 42, No. 10, Oct. 2004, pp. 74-80.

* cited by examiner

WIRELESS BINAURAL HEARING SYSTEM

CROSS REFERENCE TO RELATED APPLICATIONS

This nonprovisional application claims the benefit under 35 U.S.C. §119(e) of U.S. Provisional Application No. 61/391,084 filed on Oct. 8, 2010 and under 35 U.S.C. §119(a) to Patent Application No. 10186937.8 filed in Europe, on Oct. 8, 2010. The entire contents of all of the above applications are hereby incorporated by reference into the present application.

TECHNICAL FIELD

The present invention relates to wireless binaural hearing systems. More specifically, the present invention relates to hearing systems comprising a left-ear hearing device, a right-ear hearing device and a number of auxiliary devices, which devices communicate with each other via radio signals.

The invention may e.g. be useful in applications such as providing a hearing-impaired individual or a normal-hearing individual with binaural sound from different sources.

BACKGROUND ART

European Patent Application 1 879 426 discloses a binaural hearing system in which sound information and control information present in or received by one of the hearing aids is relayed to the respective other hearing aid in order to make the information available in both hearing aids. Relaying may be unidirectional or bidirectional. The document does not disclose any details as to how the relaying is implemented. US Patent Application 2007/0269049 discloses a similar system.

U.S. Pat. No. 7,529,565 discloses a hearing aid system, wherein a sender waits to send a message until expiration of a random time period after the wireless channel becomes free. The sender retransmits its message if it does not receive an acknowledgement from the intended receiver due to a collision with a transmission from another sender.

US Patent Application 2007/0009124 discloses a hearing aid system comprising a left-ear hearing aid, a right-ear hearing aid and a number of auxiliary devices. The hearing aids and the auxiliary devices together form a wireless network, via which they communicate with each other. Start-up of the network and admission of new devices to the network are controlled by a network master, which engages in an initialisation procedure with the new device(s). The network master is preferably one of the hearing aids, because this device is assumed to be always present on the network.

The head of a hearing-device user substantially disturbs the radio signals transmitted and received by the hearing devices, when these are in place at or in the user's ears. Consequently, the quality of the wireless communication between the hearing devices and the other devices on the network varies when the user moves his head. Such variations may lead to temporal gaps in the communication, and the duration of the gaps may vary from a few fractions of a second to several seconds or even minutes. The gaps may cause pauses and/or delays in audio signals presented to the user, e.g. during streaming of a television audio signal to the hearing devices. For a user of a binaural hearing system, such pauses and delays may be perceived as if sound sources disappear or shift their locations abruptly, which may be very annoying. Such effects may be even more pronounced, when the pauses or delays affect the left-ear and the right-ear hearing device differently. Furthermore, in a hearing system which communicates settings of one of the hearing devices to the other hearing device via radio signals, temporal gaps may cause the hearing devices to become temporarily unsynchronised, which may produce similar or other annoying audible effects.

In connection-based networks, as e.g. described in US 2007/0009124 mentioned above, gaps of longer duration may further lead to devices becoming disconnected from the network. To recover from such a long gap and allow the disconnected devices to participate on the network again, an initialisation procedure must be executed. The execution of the initialisation procedure may prolong pauses and/or delays in the audio signals presented to the user, thus worsening the problem. The execution of the initialisation procedure may take longer time if several devices become disconnected at the same time, e.g. if the network master is unreachable during a long gap.

DISCLOSURE OF INVENTION

There is therefore a need for a binaural hearing system, which provides a more reliable and/or efficient wireless communication between the hearing devices and auxiliary devices. It is an object of the present invention to provide such a binaural hearing system.

It is a further object of the present invention to provide a method for communicating in a binaural hearing system, which method allows a more reliable and/or efficient wireless communication between the hearing devices and auxiliary devices.

These and other objects of the invention are achieved by the invention described in the accompanying independent claims and as described in the following. Further objects of the invention are achieved by the embodiments defined in the dependent claims and in the detailed description of the invention.

In the present context, a "hearing system" refers to a system providing audible signals to at least one of an individual's ears, whereas a "binaural hearing system" refers to a system providing audible signals to both of a individual's ears. Such audible signals may be provided in the form of acoustic signals radiated into the individual's outer ears, acoustic signals transferred as mechanical vibrations to the individual's inner ears via the bone structure of the individual's head and/or electric signals transferred to the hearing nerve of the individual. A "hearing device" refers to a device suitable for improving or augmenting the hearing capability of an individual, such as e.g. a hearing aid or an active ear-protection device. An "auxiliary device" refers to a device communicating with the hearing devices and affecting or benefitting from the function of the hearing devices. Auxiliary devices may be e.g. remote controls, audio streaming devices, mobile phones, public-address systems and/or music players.

As used herein, the singular forms "a", "an", and "the" are intended to include the plural forms as well (i.e. to have the meaning "at least one"), unless expressly stated otherwise. It will be further understood that the terms "has", "includes", "comprises", "having", "including" and/or "comprising", when used in this specification, specify the presence of stated features, integers, steps, operations, elements and/or components, but do not preclude the presence or addition of one or more other features, integers, steps, operations, elements, components and/or groups thereof. It will be understood that when an element is referred to as being "connected" or "coupled" to another element, it can be directly connected or coupled to the other element, or intervening elements may be present, unless expressly stated otherwise. As used herein, the term "and/or" includes any and all combinations of one or more of the associated listed items. The steps of any method disclosed herein do not have to be performed in the exact order disclosed, unless expressly stated otherwise.

BRIEF DESCRIPTION OF THE DRAWINGS

The invention will be explained in more detail below in connection with preferred embodiments and with reference to the drawings in which.

The figures are schematic and simplified for clarity, and they just show details, which are essential to the understanding of the invention, while other details are left out. Throughout, like reference numerals and names are used for identical or corresponding parts.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

MODE(S) FOR CARRYING OUT THE INVENTION

Figure 1:
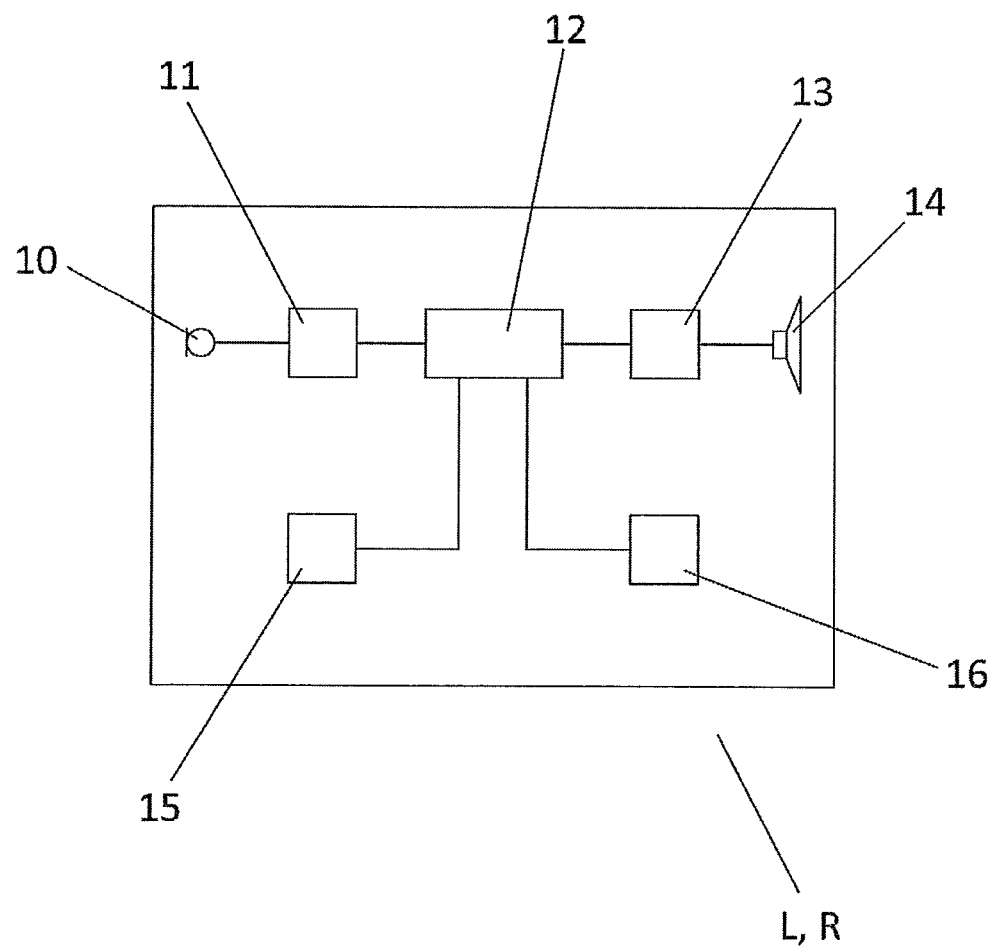
FIG. 1 shows an embodiment of a hearing device, which may be part of a binaural hearing system according to the invention.

The hearing device L, R shown in FIG. 1 comprises a microphone 10, an analog/digital-converter 11, a digital signal processor 12, a digital/analog-converter 13 and a speaker 14 connected in the mentioned order to form an audio signal path.

The microphone 10 is adapted to receive acoustic signals from a user's surroundings and to provide a corresponding electric input signal to the analog/digital-converter 11. The analog/digital-converter 11 is adapted to convert the electric input signal into a digital input signal and to provide it to the digital signal processor 12. The digital signal processor 12 is adapted to process the digital input signal and to provide a corresponding digital output signal to the digital/analog-converter 13. The digital/analog-converter 13 is adapted to convert the digital output signal into an electric output signal and to provide it to the speaker 14, which is adapted to radiate a corresponding acoustic output signal into an ear of the user. The processing within the digital signal processor 12 may comprise e.g. amplification, filtering, attenuation, compression, expansion, voice detection and/or suppression of acoustic feedback, all of which are typical processing steps in known hearing aids and/or known active ear-protection devices.

The hearing device L, R further comprises a radio transmitter 15, which is adapted to receive application and network output data from the digital signal processor 12 and to transmit corresponding application and network messages within a predefined radio frequency range, and a radio receiver 16, which is adapted to receive application and network messages within the same predefined radio frequency range and to provide corresponding application and network input data to the digital signal processor 12. The radio transmitter 15 and the radio receiver 16 are both connected to the same radio antenna (not shown). The application data and the application messages may comprise audio data, i.e. data that allow a receiving device L, R, S (see FIG. 2) to restore audio signals, and/or control data, i.e. various non-audio data, such as settings and status information, that allow a transmitting and a receiving device L, R, S to cooperate with each other. The network data and the network messages comprise data that allow or facilitate control of the network formed by the devices L, R, S. The digital signal processor 12 is further adapted to decode audio data comprised in the application input data, to process the decoded audio signal and to incorporate the processed audio signal in the digital output signal provided to the digital/analog-converter 13. This allows the user to hear audio signals received from a remote device L, R, S, B (see FIG. 2). The hearing device L, R may comprise a control processor, which instead of the digital signal processor 12 is adapted to perform any or all of the functions of generating and decoding the application and network data, controlling the radio transmitter 15 and the radio receiver 16 as well as controlling other parts of the hearing device L, R. The radio transmitter 15 and the radio receiver 16 may be combined in a single transceiver.

Figure 2:
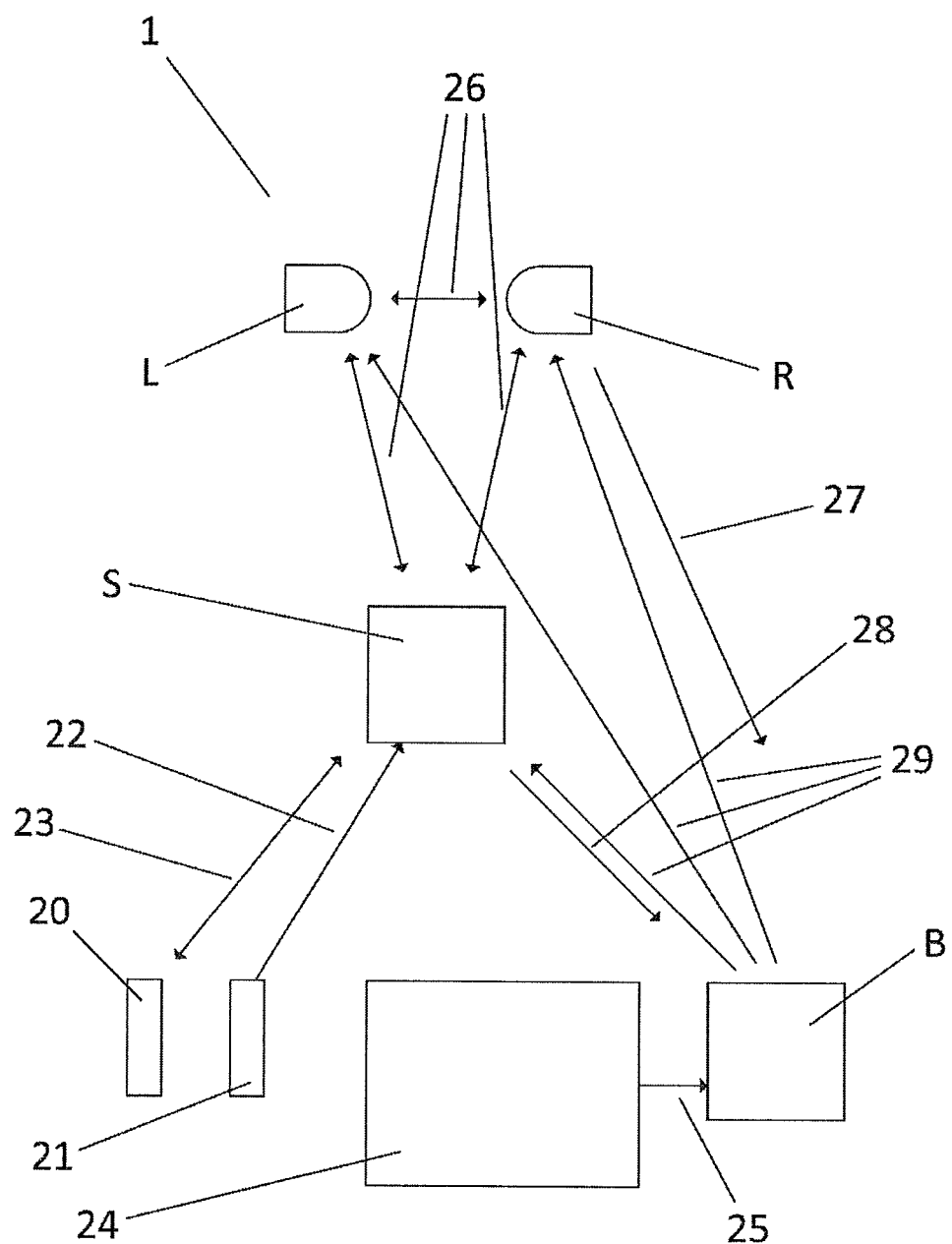
FIG. 2 shows an embodiment of a binaural hearing system according to the invention.

The binaural hearing system 1 shown in FIG. 2 comprises a left-ear hearing device L, a right-ear hearing device R, a streamer S and a TV-box B. The hearing devices L, R are preferably of the type shown in FIG. 1. The streamer S is an auxiliary device, which is adapted to receive audio signals from sources external to the system 1, such as a mobile phone 20 or a telecoil 21, and to transmit the audio signals via radio to the hearing devices L, R. The streamer S is further adapted to receive audio signals via radio from the hearing devices L, R and to transmit the audio signals to external devices, such as a mobile phone 20. The external signal sources 20, 21 may communicate with the streamer S via wires, as illustrated by the arrow 22, or via wireless links 23, such as e.g. Bluetooth radio or low-frequency radio signals. The TV-box B is an auxiliary device, which is adapted to receive audio signals from a television set 24 and to transmit the audio signals via radio to the hearing devices L, R. The TV-box B communicates with the television set 24 via a wired connection 25. The auxiliary devices S, B comprise radio transmitters (not shown) similar to the radio transmitter 15 in the hearing devices L, R. The streamer S further comprises a radio receiver (not shown) similar to the radio receiver 16 in the hearing devices L, R. The radio transmitters and the radio receiver allow the auxiliary devices S, B to communicate with each other and with the hearing devices L, R within the binaural hearing system 1. The devices L, R, S, B transmit audio data and other data, e.g. control or status information, within a common predefined radio frequency range and as explained in detail further below.

The communication ranges for the individual device combinations within the binaural hearing system 1 differ due to e.g. the different physical locations of the devices L, R, S, B and the different transmitting power in the devices L, R, S, B. During normal use, the hearing devices L, R are located in or at the user's ears, and the streamer S is typically located on the user's body. The transmitters 15 and the receivers 16 of the hearing devices L, R as well as the transmitter and the receiver of the streamer S are dimensioned for this arrangement and any of these devices L, R, S may thus normally receive radio signals 26 from any other of these devices L, R, S. The TV-box B is typically located close to the television set 24 and is thus typically not within reach of the radio signals 27 transmitted by the hearing devices L, R and of the radio signals 28 transmitted by the streamer S, which typically all have relatively little power available for radio transmissions. The TV-box B typically has relatively much power available for transmitting radio signals 29, and these radio signals 29 may thus normally, i.e. in the absence of disturbances, be received by all other of the devices L, R, S.

The hearing devices L, R and the streamer S may thus communicate bidirectionally with each other, which allows for using a radio protocol with a time-division scheme controlled by one of the hearing devices L, R and with network messages indicating successful and/or non-successful reception of application messages. Each of these devices L, R, S may decode the network messages in order to detect missing or damaged application messages or data and resend application messages or data that were not received or received with errors. Since the TV-box B, however, is excluded from receiving messages from the hearing devices L, R and the streamer S, it cannot adjust the timing of its radio transmissions to the timing of the other devices L, R, S, and it cannot receive network messages from the other devices L, R, S. The communication between the TV-box B and the other devices L, R, S is thus purely unidirectional, and the TV-box B cannot determine whether application messages are received correctly by the other devices L, R, S.

In a preferred embodiment of a binaural hearing system 1 according to the invention and comprising three devices L, R, S, the following rules and processes are implemented in order to improve the reliability of bidirectional wireless communication within the system. Each application message is transmitted by a "sender" L, R, S and comprises address information identifying one or more "addressees" L, R, S. A device L, R, S that is neither a sender nor an addressee of a particular application message is a "listener" with respect to that application message. Addressees and listeners are both "receivers". Each application message also comprises a checksum that allows a receiver to detect a reception failure. Alternatively, the application data comprised in the application message may for the same purpose be encoded using error detecting codes or error correcting codes. An addressee decodes the received application message in order to obtain the application data and responds with the transmission of a network message, i.e. an acknowledgement (ACK) message if the decoding was successful, or a non-acknowledgement (NACK) message if the decoding failed. A listener may decode the received application message, but does not respond with a network message. The sender receives the network messages and proceeds to transmitting a subsequent application message if it determines that each addressee responded positively to the original message, i.e. transmitted an ACK message in response to the first transmission of the application message. If one addressee responded negatively to the original message, i.e. with an NACK message, the other addressee or listener relays the application message by transmitting the contents of the original message.

Each addressee other than the relaying device responds to the relayed message with the appropriate ACK or NACK message. The sender pauses its transmissions during the relaying. The sender proceeds to sending a subsequent application message if the sender determines that each addressee has now responded positively to at least one of the original message and the relayed message. Otherwise, the sender resends the original message. The reactions to the resent message are governed by the same rules as the reactions to the original message, and the sender repeats resending until it determines that each addressee has responded positively to at least one of the original message, a resent message and a relayed message. The application message comprises expiration information that causes the sender to stop resending the message after a specified time and/or a specified number of transmissions. The expiration information may also be used to prevent listeners from relaying specific messages. If an addressee or a listener does not receive any response from the (other) addressee, then it refrains from relaying in order to avoid a possible collision with a subsequent application message from the sender. Similarly, if the sender does not receive any response from at least one of the addressees, then it pauses for a time long enough to allow another addressee or a listener to relay the message.

Figure 3:
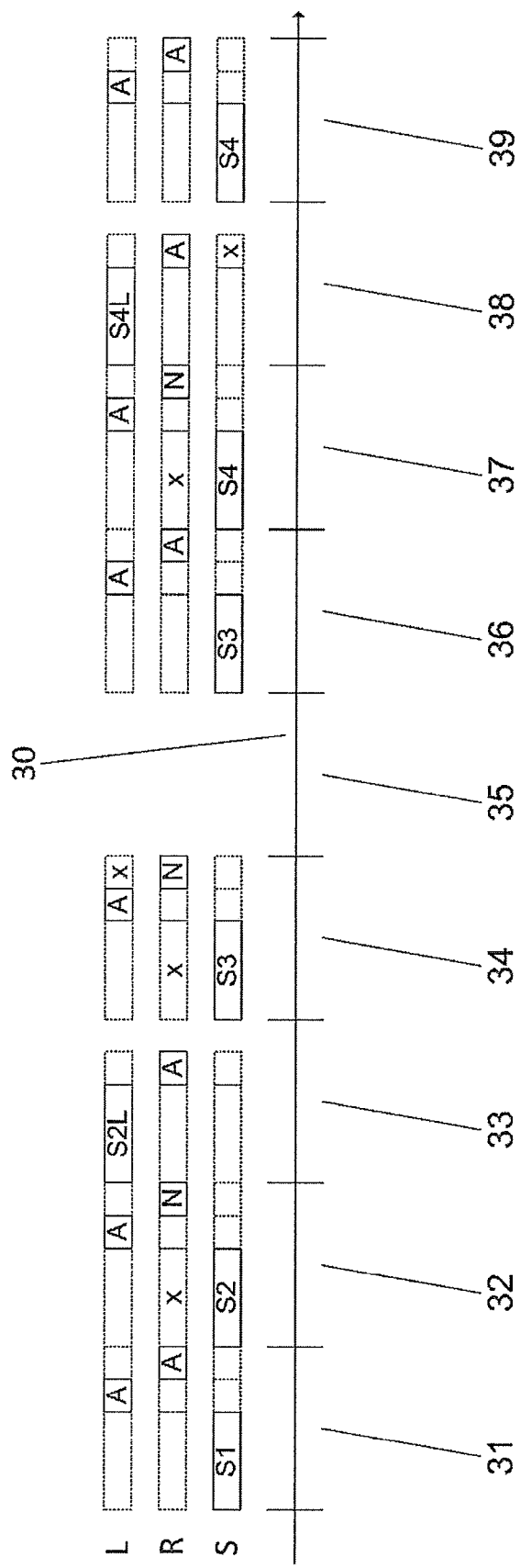
FIG. 3 shows an example message sequence illustrating relaying of data messages within the binaural hearing system.

The example message sequence shown in FIG. 3 illustrates relaying and resending of application messages S1-S4 in the binaural hearing system 1 and according to the rules mentioned above. The time progresses towards rights as illustrated by the arrow 30. Application messages S1-S4 are transmitted within different time slots 31-39 in order to avoid collisions among the messages. The first portion of each time slot 31-39 is reserved for transmission of application messages S1-S4, and the remaining portion is reserved for network messages A, N from the receivers L, R. In the shown example, the left-ear hearing device L always transmits its network messages A, N before the right-ear hearing device R, but any other order of transmission, dynamic or static, may be used. Each row L, R, S indicates the time- and message-dependent state of the respective corresponding device L, R, S. A solid-lined box indicates that the device L, R, S transmits a message. An empty dot-lined box indicates that the device L, R, S receives the message, whereas a dot-lined box with an "x" indicates that the device L, R, S either does not receive the message or receives it with errors, e.g. due to a gap in the received signals. In the shown example, the streamer S transmits four application messages S1-S4, each addressed to both hearing devices L, R. The application messages S1-S4 together contain a sound signal to be played to the hearing-device user, and it is thus highly desired that all of the application messages S1-S4 reach their destinations and in the shown order.

In the first time slot 31, the streamer S transmits the first application message S1. Both hearing devices L, R receive the first application message S1 and respond positively with ACK messages A indicating the correct reception of the application message S1. The streamer S receives both ACK messages A and thus proceeds to transmitting the second application message S2 in the second time slot 32. The left-ear hearing device L receives the second application message S2 and responds with an ACK message A. The right-ear hearing device R, however, receives the second application message S2 with errors and responds negatively with an NACK message N. Having received the NACK message, the streamer S pauses transmission during the following time slot 33. Instead, the left-ear hearing device L, which has also received the NACK message, relays the second application message S2 by transmitting a message S2L comprising the application data comprised in the original message S2. The right-ear hearing device R receives the relayed message S2L and responds with an ACK message A. The streamer S receives the ACK message A, determines that both hearing devices L, R have received the application data correctly and proceeds to sending the subsequent application message S3 in the following time slot 34. The left-ear hearing device L receives the third application message S3 and responds with an ACK message A. The right-ear hearing device R receives the third application message S3 with errors and responds with an NACK message N. The left-ear hearing device L does not receive the NACK message N and does thus not relay the third application message S3 in the following time slot 35. The streamer S pauses its transmission during this time slot 35, since it is not able to determine whether the left-ear hearing device L will relay the third application message S3. The streamer S does still not receive an ACK message from the right-ear hearing device R and thus resends the third application message S3 in the following time slot 36. This time, both hearing devices L, R respond with ACK messages, and the streamer proceeds to sending the fourth application message S4 in the following time slot 37. The left-ear hearing device L receives the fourth application message S4 and responds with an ACK message A. The right-ear hearing device R receives the fourth application message S4 with errors and responds with an NACK message N. Having received the NACK message, the streamer S pauses transmission during the following time slot 38, and the left-ear hearing device L, which has also received the NACK message, relays the message by transmitting a message S4L comprising the application data comprised in the original message S4. The right-ear hearing device R receives the relayed message S4L and responds with an ACK message A. The streamer S does not receive the ACK message A and thus resends the fourth application message S4 in the following time slot 39, wherein both hearing devices L, R respond with ACK messages that are both received by the streamer S.

In the shown example, four different application messages S1-34 are transmitted successfully using nine time slots. The efficiency of the network communication may be increased by letting the relaying device L also relay ACK messages A from an addressee R that receives a relayed message S2L, S4L correctly, e.g. in the third and eighth time slots 33, 38. For instance, relaying the ACK message A from the right-ear hearing device R in the eighth time slot 38 could have prevented the streamer S from resending the fourth application message S4 in the ninth time slot 39.

The network may be configured to allow interleaved transmit access to the time slots 31-39 in order to enable seemingly simultaneous, multi-directional transmission of application data between the devices L, R, S. In this case, different sets of time slots 31-39 are allocated to the respective devices L, R, S in the network, and each device L, R, S is allowed to transmit application data only in the time slots 31-39 allocated to it. The time slots 31-39 may be allocated in a cyclic scheme so that each device L, R, S may transmit within every third time slot 31-39. In such a network configuration, the efficiency may be further increased by allowing relaying of application data only in the time slots 31-39 allocated to the relaying device L. The relaying does thus not take up time slots 31-39 allocated to the sender S, and the sender S may thus complete the transmission of a series of application data within a smaller number of time slots 31-39. Allocation and synchronisation of the time slots 31-39 may be made using any of the various methods that are well known in the prior art pertaining to packet-based radio networks. For instance, it may be appropriate to adjust the timing of the time-slots to the transmissions from the TV-box B in order to reduce the risk of message collisions. If e.g. one of the hearing devices L, R acts as a network master, this device may send a corresponding network message to the other devices in order to cause a time shift and/or a change of the duration of the time slots. The network message may contain data specifying the amount of time shift and/or duration of the time slots.

In order to optimise the efficiency of the network communication, various further modifications may be made to the network protocol. For instance, a receiver L, R may transmit a NACK message N when it detects that a time-slot 31-39 has passed without it receiving an application message S1-S4. Furthermore, a receiver L, R may relay an application message S1-S4 upon detecting that another addressee L, R has not responded. A receiver L, R, S may be configured to also relay broadcast messages, e.g. from the TV-box B. The latter requires that the receivers L, R, S are configured to transmit ACK and/or NACK messages in response to such broadcast messages. In other words, broadcast messages may be seen as messages addressed to all devices L, R, S in the network. The relaying by the streamer S may also be utilised in a hearing system 1 comprising only one hearing device L, R. A specific one of the devices L, R, S, e.g. the streamer S, may be configured to relay broadcast messages, e.g. from the TV-box B, independent of receiving ACK or NACK messages from the other receivers L, R. Which protocol is eventually preferred, depends on various factors, such as the probability of data errors, the amount and importance of data to be transmitted as well as the power and energy available for radio transmissions.

Features and Advantages of Preferred Embodiments

The below described features of preferred embodiments of the invention may be combined arbitrarily with each other and/or with features mentioned above in order to adapt the method and/or the system according to the invention to specific requirements.

A preferred embodiment of the invention may comprise a binaural hearing system 1 comprising a left-ear hearing device L, a right-ear hearing device R and an auxiliary device S, B, each device L, R, S, B comprising a radio transmitter 15 for transmitting messages, each hearing device L, R comprising a radio receiver 16 for receiving messages, the auxiliary device S, B being adapted to transmit application messages S1-S4, the hearing devices L, R being adapted to receive application messages S1-S4, a first one of the hearing devices L being adapted to transmit and thus relay received application messages S2, S4 and a second one of the hearing devices R being adapted to receive relayed application messages S2L, S4L. Furthermore, the second hearing device R may be adapted to transmit network messages A, N indicating whether application messages S1-S4 were correctly received, and the first hearing device L may be adapted to relay received application messages S2, S4 in dependence on received network messages A, N. Letting an intermediate device L relay application messages S2, S4 that were possibly not correctly received by a receiver R allows for having several physical communication paths between the sender S and the receiver R. This may reduce the occurrence of gaps in the communication and may thus improve the reliability of the communication, however without substantially increasing the power consumption of the system 1. Relaying application messages S2-S4 only when the listener L positively detects that the receiver R did not receive the original message S2-S4 correctly, and/or only when the listener L does not positively detect that the receiver R has received the original message S2-S4 correctly, may decrease the number of relayed messages and thus the power consumption of the system 1. It may furthermore increase the efficiency of the network communication.

Advantageously, a subset of the application messages S1-S4 comprises address information specifying an addressee, and the first hearing device L is adapted to relay received application messages S2, S4 in dependence on the addressee being the second hearing device R. Relaying only application messages S2-S4 that are addressed to the receiver R, may decrease the number of relayed messages and thus the power consumption of the system 1 further. It may also further increase the efficiency of the network communication.

Advantageously, the first hearing device L is further adapted to relay received network messages A, N. Relaying network messages A, N may decrease the number of relayed application messages and thus the power consumption of the system 1 further. It may also further increase the efficiency of the network communication.

Advantageously, each of the devices L, R, S, B is further adapted to transmit application messages S1-S4, S2L, S4L only within time slots 31-39 allocated to that device L, R, S, B. Relaying application messages S2-S4 only within time slots 31-39 allocated to the relaying device L, may further increase the efficiency of the network communication.

A preferred embodiment of the invention may comprise a method for communicating by means of radio signals within a binaural hearing system 1 comprising a left-ear hearing device L, a right-ear hearing device R and an auxiliary device S, B, the method comprising: transmitting application messages S1-S4 by the auxiliary device S, B; receiving application messages S1-S4 by the hearing devices L, R; transmitting and thus relaying received application messages S2, S4 by a first one of the hearing devices L; and receiving relayed application messages S2L, S4L by a second one of the hearing devices R, wherein the method further comprises: transmitting network messages A, N by the second hearing device R indicating whether application messages S1-S4 were correctly received; and relaying received application messages S2, S4 by the first hearing device L in dependence on received network messages A, N. Letting an intermediate device L relay application messages S2, S4 that were possibly not correctly received by a receiver R allows for having several physical communication paths between the sender S and the receiver R. This may reduce the occurrence of gaps in the communication and may thus improve the reliability of the communication, however without substantially increasing the power consumption of the system 1. Relaying application messages S2-S4 only when the listener L positively detects that the receiver R did not receive the original message S2-S4 correctly, and/or only when the listener L does not positively detect that the receiver R has received the original message S2-S4 correctly, may decrease the number of relayed messages and thus the power consumption of the system 1. It may furthermore increase the efficiency of the network communication.

Advantageously, the method further comprises: in a subset of the application messages S1-S4 providing address information specifying an addressee; and relaying received application messages S2, S4 by the first hearing device L in dependence on the addressee being the second hearing device R. Relaying only application messages S2-S4 that are addressed to the receiver R, may decrease the number of relayed messages and thus the power consumption of the system 1 further. It may also further increase the efficiency of the network communication.

Advantageously, the method further comprises relaying received network messages A, N by the first hearing device L. Relaying network messages A, N may decrease the number of relayed application messages and thus the power consumption of the system 1 further. It may also further increase the efficiency of the network communication.

Advantageously, the method further comprises transmitting application messages S1-S4, S2L, S4L only within time slots allocated to the transmitting device L, R, S, B. Relaying application messages S2-S4 only within time slots 31-39 allocated to the relaying device L, may further increase the efficiency of the network communication.

Relaying may take place by any device L, R, S able thereto and in any direction of communication. However, letting a hearing device L act as a relaying device may significantly improve the reliability of the network communication between the hearing devices L, R and the auxiliary devices S, B. The hearing devices L, R are typically able to communicate with high reliability with each other most of the time, and since they are located on opposite sides of the user's head, most of the time at least one of the hearing devices L, R is typically able to communicate with high reliability with auxiliary devices S, B.

A preferred embodiment of the invention may comprise a binaural hearing system 1 comprising a left-ear hearing device L, a right-ear hearing device R and an auxiliary device S, each device L, R, S comprising a radio transmitter 15 for transmitting messages and a radio receiver 16 for receiving messages, a first one of the hearing devices L being adapted to transmit application messages S1-S4, the auxiliary device S and a second one of the hearing devices R being adapted to receive application messages S1-S4, the auxiliary device S being adapted to transmit and thus relay received application messages S2, S4 and the second hearing device R being adapted to receive relayed application messages S2L, S4L. This system 1 may provide substantially the same advantages as the system 1 wherein a hearing device L, R relays application messages S1-S4 from the auxiliary device S to the respective other hearing device L, R.

A preferred embodiment of the invention may comprise a method for communicating by means of radio signals within a binaural hearing system 1 comprising a left-ear hearing device L, a right-ear hearing device R and an auxiliary device S, the method comprising: transmitting application messages S1-S4 by a first one of the hearing devices L; receiving application messages S1-S4 by a second one of the hearing devices R and by the auxiliary device S; transmitting and thus relaying received application messages S2, S4 by the auxiliary device S; and receiving relayed application messages S2L, S4L by the second hearing device R. This method may provide substantially the same advantages as the method wherein a hearing device L, R relays application messages S1-S4 from the auxiliary device S to the respective other hearing device L, R.

A preferred embodiment of the invention may comprise a hearing system 1 comprising a hearing device L, R, a first auxiliary device B and a second auxiliary device S, each device L, R, B, S comprising a radio transmitter 15 for transmitting messages, the hearing device L, R and the second auxiliary device S comprising a radio receiver 16 for receiving messages, the first auxiliary device B being adapted to transmit application messages S1-S4, the hearing device L, R and the second auxiliary device S being adapted to receive application messages S1-S4, the second auxiliary device S being adapted to transmit and thus relay received application messages S2, S4 and the hearing device L, R being adapted to receive relayed application messages S2L, S4L. This system 1 may provide substantially the same advantages as the system 1 wherein a hearing device L, R relays application messages S1-S4 from the auxiliary device S to the respective other hearing device L, R.

A preferred embodiment of the invention may comprise a method for communicating by means of radio signals within a hearing system 1 comprising a hearing device L, R, a first auxiliary device B and a second auxiliary device S, the method comprising: transmitting application messages S1-S4 by the first auxiliary device B; receiving application messages S1-S4 by the hearing device L, R and the second auxiliary device S; transmitting and thus relaying received application messages S2, S4 by the second auxiliary device S; and receiving relayed application messages S2L, S4L by the hearing device L, R. This method may provide substantially the same advantages as the method wherein a hearing device L, R relays application messages S1-S4 from the auxiliary device S to the respective other hearing device L, R.

Some preferred embodiments have been shown in the foregoing, but it should be stressed that the invention is not limited to these, but may be embodied in other ways within the subject-matter defined in the following claims. For example, the features of the described embodiments may be combined arbitrarily.

It is further intended that the structural features of the system described above, in the detailed description of 'mode(s) for carrying out the invention' and in the claims can be combined with the methods, when appropriately substituted by a corresponding process. Embodiments of the methods have the same advantages as the corresponding systems.

Any reference numerals and names in the claims are intended to be non-limiting for their scope.

The invention claimed is:

1. A binaural hearing system, comprising:
a left-ear hearing device,
a right-ear hearing device and
an auxiliary device,
each device comprising a radio transmitter for transmitting messages,
each hearing device comprising a radio receiver for receiving messages,
the auxiliary device being adapted to transmit application messages,
each of the hearing devices being adapted to receive the application messages and to transmit non-acknowledgement messages indicating that the application messages were not correctly received,
a first one of the hearing devices being adapted to transmit and thus relay received application messages,
a second one of the hearing devices being adapted to receive relayed application messages, wherein
the first hearing device is adapted to relay the received application messages in dependence on receiving non-acknowledgment messages transmitted by the second hearing device, and
wherein each of the devices is further configured to transmit application messages only within time slots allocated to that device.

2. A binaural hearing system according to claim 1, wherein
a subset of the application messages comprises address information specifying an addressee, and
the first hearing device is adapted to relay the received application messages in dependence on the addressee being the second hearing device.

3. A binaural hearing system according to claim 1 or 2, wherein
the first hearing device is further adapted to relay received network messages.

4. A binaural hearing system according to claim 1, wherein the auxiliary device comprises a remote control, an audio streaming device, a mobile phone, a public-address system, and/or a music player.

5. A binaural hearing system according to claim 1, wherein the hearing devices are configured to improve or augment the hearing capability of an individual.

6. A binaural hearing system according to claim 1, wherein the hearing devices comprise a hearing aid or an active ear-protection device.

7. A binaural hearing system according to claim 1, wherein the relative order of time slots allocated within each transmission cycle to each of the devices is fixed and invariant.

8. A binaural system according to claim 1, wherein
each hearing device is configured to not transmit a positive acknowledgement when it correctly receives an application message.

9. A method for communicating via radio signals within a binaural hearing system including a left-ear hearing device, a right-ear hearing device and an auxiliary device, the method comprising:
transmitting application messages by the auxiliary device;
receiving the application messages by the hearing devices;
transmitting non-acknowledgement messages indicating that the application messages were not correctly received by the hearing devices;
transmitting and thus relaying received application messages by a first one of the hearing devices;
receiving relayed application messages by a second one of the hearing devices; and
relaying the received application messages by the first hearing device in dependence on receiving non-acknowledgement messages transmitted by the second hearing device, wherein
the transmitting of the application messages takes place only within time slots allocated to the transmitting device.

10. The method according to claim 9, further comprising:
in a subset of the application messages providing address information specifying an addressee; and
relaying the received application messages by the first hearing device in dependence on the addressee being the second hearing device.

11. The method according to claim 9 or 10, further comprising:
relaying received network messages by the first hearing device.

12. A method according to claim 9, wherein
the left-ear hearing device and the right-ear hearing device do not transmit a positive acknowledgement upon correctly receiving an application message, and
the relative order of time slots allocated to each of the devices is fixed and invariant.

* * * * *